Figure 1:
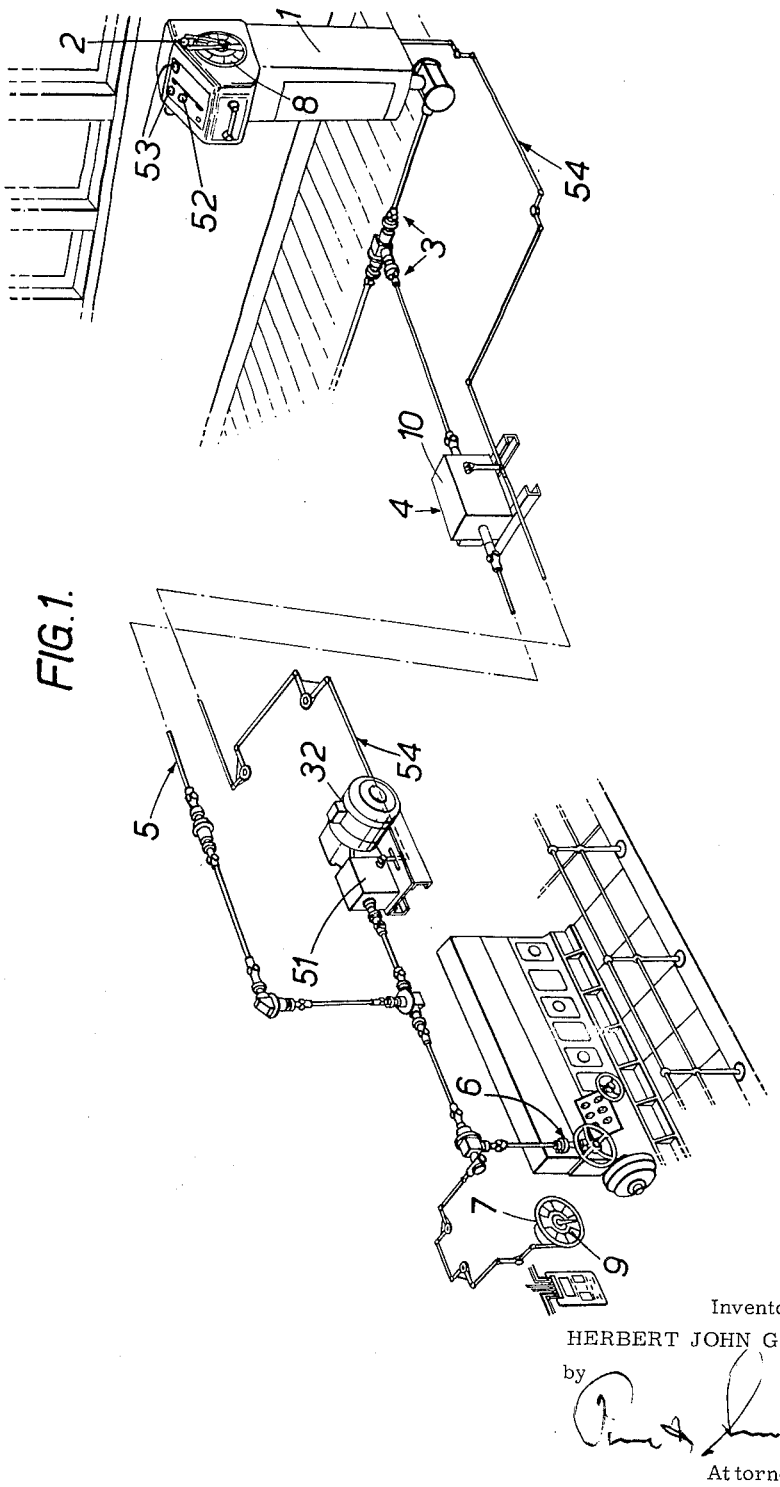

Inventor:
HERBERT JOHN GOODWIN
by
Attorney

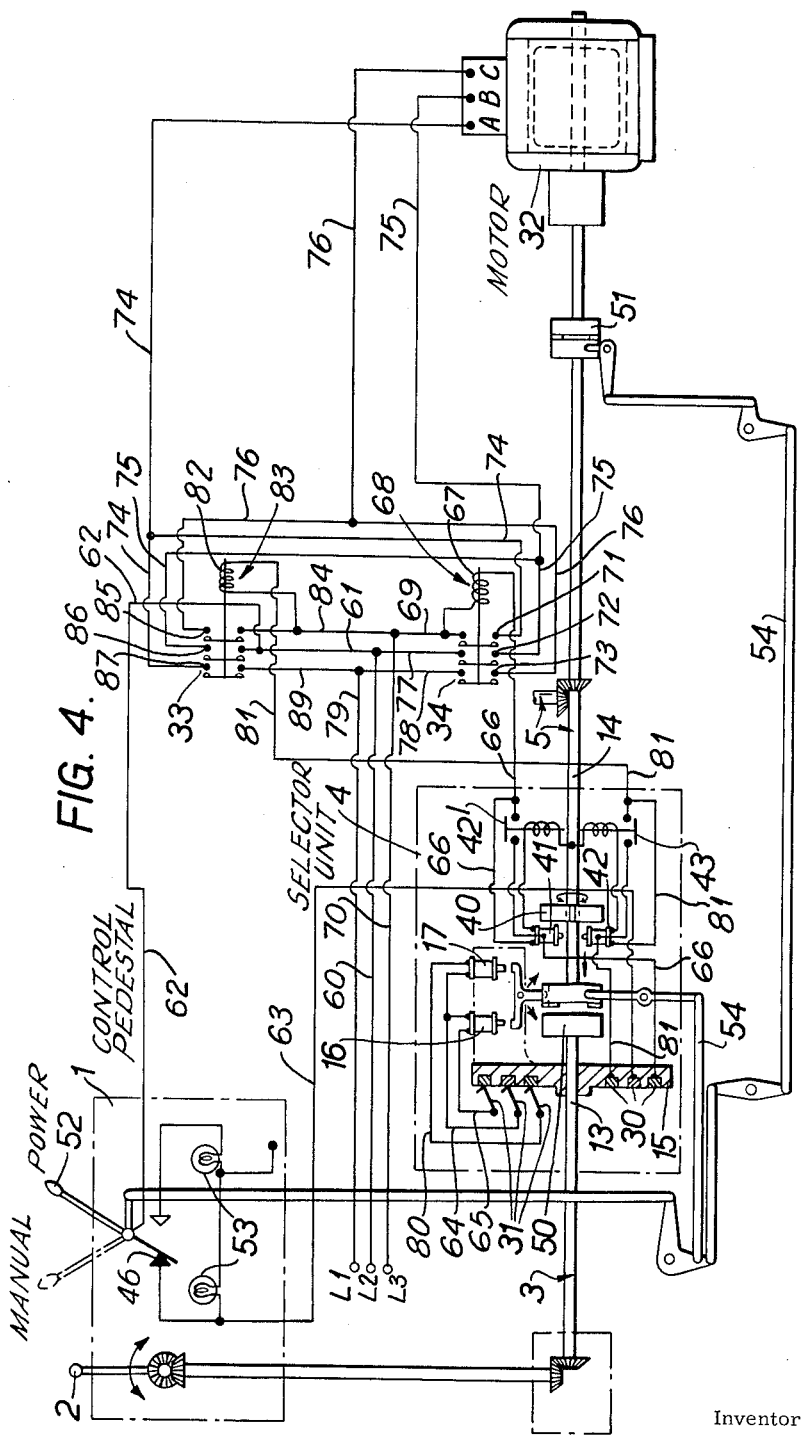

United States Patent Office 3,210,628
Patented Oct. 5, 1965

3,210,628
REMOTE CONTROL APPARATUS FOR THE CONTROL MEANS OF A PRIME MOVER
Herbert John Goodwin, London, England, assignor to Bloctube Controls Limited, Aylesbury, England, a British company
Filed Sept. 10, 1962, Ser. No. 222,460
Claims priority, application Great Britain, Sept. 11, 1961, 32,588/61
4 Claims. (Cl. 318—31)

This invention concerns remote control apparatus of the kind in which a system of control rods is employed for transmitting movement to the controls of a prime mover from a manually operable control handle disposed at a position remote from the prime mover.

In my co-pending patent application No. 133,665 filled August 24, 1961, I have disclosed and claimed remote control apparatus comprising a manually operable control handle, and a system of rotatable control rods extending between the control handle and/or an indicator therefor, said system having therein near the control handle a selector unit into which passes in co-extending relationship two of said rods and which includes clutch means whereby these two rods may selectively be connected for direct manual control between the control handle and the prime mover and/or the indicator therefor or disconnected to enable the rods between the selector unit and the prime mover and/or the indicator therefor to be rotated by an electric motor independently of the rods between the control handle and the selector unit, further clutch means being provided between the motor and the rods rotated thereby, control for both clutch means being such that when one is engaged the other is disengaged, said selector unit also including a control member carried by one of said two rods which is operatively connected to the control handle so that it and thus the control member always moves therewith, any movement of said control member being adapted to operate switch means energizing the electric motor, and a follow-up member carried by the other of said two rods and movable in relation to and adapted to co-operate with the control member to cause operation of the switch means again to stop the motor after movement of the prime mover and/or the indicator therefor corresponding to the initial movement of the control handle has taken place.

The remote control apparatus that I have particularly described in my said co-pending application is especially adapted for use in a ship's control system and the described control apparatus is intended to be capable of transmitting movement from the control handle directly to the ship's engine and transmission controls.

With such remote control apparatus initial operation of the control handle in either direction selects electric switch means to be operated and through the chosen switch effects the energizing of the electric motor which drives the rods associated therewith through a reduction gear at a pre-selected r.p.m. until such time as the position of the control member and the driven follow-up member again synchronise.

It will thus be appreciated that the control handle may be positioned, for example, to "full ahead" and the electric motor for the adjustment of the prime mover be caused to operate without interruption, thus permitting, for example, the engine speed to be increased before the appropriate clutches, e.g., hydraulically actuated clutches, have been fully engaged with the possibility of consequential damage. An object of this invention is to provide means whereby the possibility of such damage may be eliminated or reduced.

The remote control apparatus in accordance with the present invention comprises a manually operable control handle and a system of control rods extending between such handle and the controls for a prime mover and/or transmission gear or the like and/or an indicator therefor, such system having therein near the control handle a selector unit which includes a control member operatively connected to the control handle so as always to move therewith, this control member being adapted on any movement thereof to operate switch means for energizing an electric motor to transmit movement to the rods or shafting between the selector unit and the prime mover and/or transmission or the like and/or the indicator therefor, which rods or shafting are free to move independently of the control handle but are adapted to operate a follow-up member which is movable with respect to the said control member and adapted to operate said switch means to stop the electric motor after the latter has effected a movement of the controls for the prime mover and/or transmission gear or the like and/or the indicator therefor, corresponding to the initial movement of the control handle, has taken place; and means also driven from said electric motor and adapted to activate time delay mechanism after a predetermined movement has been made by the said follow-up member to initiate the operation of the said controls for the prime mover and/or transmission gear or the like and/or the indicator therefor, activation of said time delay mechanism interrupting for a predetermined period the operation of said electric motor and consequently affording the necessary time for the effective operation of said controls for the prime mover and/or transmission gear or the like and/or the indicator therefor.

The said time delay mechanism actuating means may comprise a cam incorporated in or rigidly connected to the said follow-up member.

Thus, in the case of a ship's control system, the time delay mechanism may be arranged to provide a time delay appropriate to the time required for engagement of the respective "ahead" and "astern" clutches.

It will be apparent that by the present invention means are provided whereby operation of the control handle will effect initial actuation of the electric motor and a movement of the controls for the prime mover sufficient to initiate the operation of such controls whereafter the means for activating the said time delay mechanism will cause a dwell of the electric motor for a pre-selected period such as to allow the completion of the engagement of clutches and the like whereafter the electric motor will be re-energised until the condition selected by the control handle has been reached, i.e. where the said control member and the said follow-up member are again synchronised in the selector unit.

Figure 2:
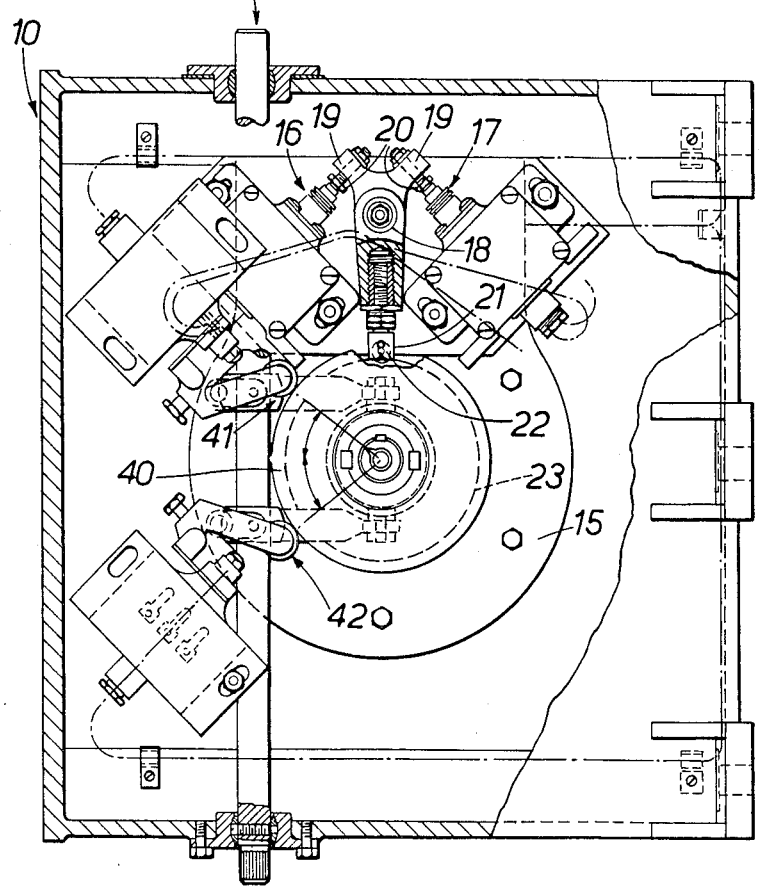
Figure 3:
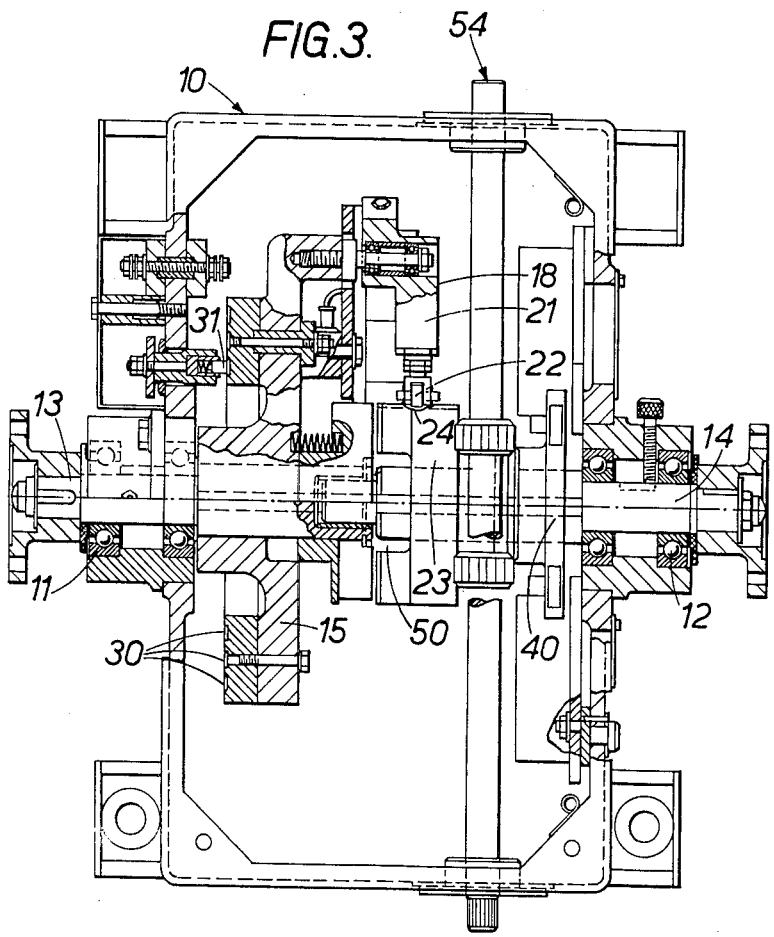

In the accompanying drawings:
FIGURE 1 illustrates a form of ship's control equipment incorporating the present invention,
FIGURE 2 is a section through the selector unit of the equipment shown in FIGURE 1, being drawn on an enlarged scale,
FIGURE 3 is a like section taken at right angles to the section shown in FIGURE 2, and
FIGURE 4 is a diagram illustrating the electric wiring provided in the equipment shown in FIGURES 1, 2 and 3.

The ship's control equipment shown in FIGURE 1 of the drawings comprises a control pedestal 1 having a main control handle or lever 2 and a system of input rods identified generally by the reference number 3 extending from the pedestal to a selector unit 4 and output rods identified generally by the reference number 5 extending from the selector unit to the ship's engine room where there can be direct connection to the ship's engine controls and transmission 6 and, if desired, additionally to indicator means 7. The pedestal includes an indicator dial 8 for indicating "stop" and speeds "ahead" and "astern" and the indicator means 7 in the engine room, if provided, will have a similar dial 9.

The selector unit 4 is disposed near the control pedestal 1 and comprises a box 10 having in two opposite sides thereof journals 11 and 12 for the coaxially extending but separate input and output rods 13 and 14 of the aforesaid system of rods. The input rod 13 is directly subject to movement of the pedestal control handle 2 but, except as explained hereinafter, there is no direct driving connection between this input rod 13 and the output rod 14 which is, however, in direct driving connection with the remainder of the said system of rods down to the engine room.

The said input rod 13 has fixedly secured thereto, inside the box of the selector unit, a ring-like control member 15 which forms a switch carrier assembly, this member being extended on one side and having mounted thereon two electric micro-switches 16 and 17. Also mounted on this control member is a carrier member 18 which is rockable about a central pivot and which has an arm 19 on each side of this pivot and extending away from the latter, each such arm carrying a switch actuating element 20 and the arrangement being such that on rocking the carrier member in either direction, one or the other of the micro-switches will be caused to close by the respective element.

The carrier member 18 also has a finger 21 which extends towards the axis about which the ring-like control member 15 rotates and has in its free end a stud 22 directed towards such axis. This stud engages a circular cam 23 constituting a follow-up member and is fixedly secured to the selector unit end of the said output rod 14 coaxial with the input rod 13 and the ring-like control member 15, said cam having in its periphery a recess 24 in which the tip of the stud 22 is received when the ring-like control member 15 and the follow-up member cam 23 are in corresponding rotational or synchronised positions. However, on rotation of the ring-like control member 15 in either direction, the stud 22 is swung or displaced out of the recess 24 whereby the carrier member 18 will be caused to rock thereby to effect closure of one or the other of the micro-switches 16 and 17.

The micro-switches 16 and 17 are arranged in electric circuits (See FIGURE 4) which include suitable mutually insulated slip rings 30 and brushes 31 on and in the ring-like control member 15 and the box 10 of the selector unit respectively, and a power supply for controlling the operation of an electric servo-motor 32 in response to the closure of either of the two micro-switches. The micro-switches 16 and 17 are respectively associated with forward and reverse starter contactors 33 and 34 for the electric servo-motor 32 and the latter is coupled to the output rod 14 of the selector unit in such manner as to drive such shaft and the remainder of the control rod system 5 connected thereto in the same direction as a rotary movement of the ring-like control member 15 which effects the closure of one of the said micro-switches. That is to say, the micro-switches 16 and 17 are so arranged as to energise the electric motor 32 to cause the output rod 14 of the selector unit to follow any movement of the input rod 13 of the selector unit.

On the said follow-up member 23 or output rod 14 is rigidly carried a time delay mechanism activating cam 40 which rotates therewith and is arranged to co-operate with a pair of changeover switches 41 and 42 in circuit with the individual micro-switches 16 and 17. The changeover switches 41 and 42 and the activating cam 40 are so arranged that a movement of the follow-up member 23 to initiate the operation, putting into gear or driving connection of the ship's engine actuates the changeover switch that is in circuit with the micro-switch which is closed by the movement of the ring-like control member 15 and which initiates the movement of the follow-up member 23. When in its normal (non-operated) condition each said changeover switch connects its associated micro-switch 16 or 17 directly to the associated electric motor starter contactor 33 or 34 respectively. In its operated condition however, such changeover switch interrupts the direct connection between the associated micro-switch and starter contactor and establishes an alternative circuit between the micro-switch and the starter contactor through the intermediary of an electric or electro-pneumatic time delay mechanism 42' or 43, the latter being responsive to power supplied through its associated micro-switch to close the circuit to its associated starter contactor after a predetermined period has elapsed. Such delay period may be of any suitably value and may, for instance, be of one or more seconds, the period being chosen to allow the appropriate time for operation (e.g., buildup of hydraulic fluid pressure) of the relevant drive transmitting clutches of the ship's engine.

In considering the operation of the circuit of FIG. 4 in association with the equipment of FIGS. 1, 2 and 3, let it be assumed that ringlike member 15, in response to the turning of lever 2 in a given direction, is rotated in the corresponding direction to effect the closing of switch 16 and the closing of changeover switch 42. When this occurs, the circuit through the operating coil of switch 16 is completed to energize such coil and also places in circuit the coil of time delay mechanism 42' which is energized after a given delay period as explained hereinabove. When the operating coil of time delay mechanism has picked up, its contact closes the circuit between the operating coil of switch 16 and its associated starter contactor 34. Consequently, the contacts of contactor 34 assume the closed position and current is supplied to motor 32 to cause it to rotate in a direction responsive to the one initiated by the turning of control lever 2.

It will be understood that with an arrangement as above described, the electric motor may, when energised, drive the control rod system 5 at any suitable speed, the time delay units delaying engine control movements for the interval required for operation of the drive clutches. Thus the arrangement enables a rapid response to be obtained from the ship's engines to signalled demands for speed changes whilst damage to the engine drive clutches as a result of acceleration of the ship's engine prior to full engagement of such a clutch is avoided. The arrangement is particularly suitable for use in controlling ship's engines that drive through hydraulically operated clutches or couplings that require an appreciable period for engagement and which are prone to damage if called upon to transmit high powers before they are fully engaged.

The electric circuit arrangements are also such that during the return of the cam 40 from an operational position to its neutral position, the said time delay mechanism will be ineffective to interrupt the current supply to the electric servo-motor.

As in the case of the remote control apparatus disclosed in my aforesaid copending application the remote control apparatus just described includes clutches 50 and 51 for connecting the input and output rods of the selector unit for direct transmission of movement from the one to the other and for disengaging the electric servo-motor drive to the output rod to permit direct manual control in case of failure of the electric servo-motor or of its power supply. Such clutches are interlocked as described in our said specification so that the electric servo-motor will be disconnected by its clutch whenever the two rods of the selector unit are interconnected by their clutch. They are also operated by means of a common control lever 52 on the pedestal 1, appropriate indicator lights 53 being provided. The control lever 52 operates the clutches through shafting 54.

The two operative electric circuits will now be traced with reference to FIG. 4, the aforesaid changeover switches 41, 42 and time delay mechanisms $42^1$, 43 being ignored to start with.

Thus, commencing with terminal L2 the common elements of the two circuits comprise leads 60, 61 and 62 to a main electric switch 46, lead 63 from this switch to the central slip ring 30 in the member 15 and its associated brush 31, and a lead 64 to the two micro-switches 16 and 17. Indicator lights 53 are connected in parallel with the lead 63.

For the first circuit the micro-switch 16 will be operated. This completes the circuit through lead 65 and a brush 31 to the outermost slip ring 30 in the member 15, through a lead 66 to the coil 67 of relay or contactor 68 and so through leads 69 and 70 to terminal L3.

The contacts 71, 72 and 73 of the relay 68 are caused to close, being respectively connected by leads 74, 75 and 76 to the terminals A, B and C of the motor 32. The contact 71 is also connected to lead 69 and so through lead 70 to the terminal L3. The contact 72 is also connected to lead 77 and so through lead 60 to terminal L2. The contact 73 is also connected to lead 78 and so through lead 79 to terminal L1. The motor 32 will thus be caused to rotate in one direction.

For the second circuit the micro-switch 17 will be operated. This completes the circuit through lead 80 and a brush 31 to the innermost slip ring 30 in the member 14, through a lead 81 to the coil 82 of contactor or relay 83 and so through leads 84 and 70 to terminal L3.

The contacts 85, 86 and 87 of the relay 83 are caused to close, being respectively connected by leads 76, 75 and 74 to the terminals C, B and A of the electric motor 32. The contact 85 is also connected to lead 84 and so through lead 70 to the terminal L3. The contact 86 is also connected to lead 61 and so through lead 60 to terminal L2. The contact 87 is also connected to lead 89 and so through lead 79 to terminal L1. The motor 32 will thus be caused to rotate in the opposite direction.

The changeover switch 41 with its associated time delay mechanism 42$^1$ is interposed in the first circuit between the outermost slip ring 30 and the coil 67 of the relay 68, being connected into a break in the lead 66. The changeover switch 42 with its associated time delay mechanism 43 is interposed in the second circuit between the innermost slip ring 30 and the coil 82 of the relay 83, being connected into a break in the lead 81.

Although only one embodiment of my invention has been shown and described by way of illustration, it will be understood that my invention may be differently embodied within the scope of the appended claims.

I claim:

1. Remote control apparatus for the control means of a prime mover requiring a delay time after operation of its control means for effective coupling of said control means to driven means, said remote control apparatus comprising in combination, a manually operable control lever; a selector unit for effecting operative connection between said lever and said control means; a control member operatively connected to said control handle in said selector unit; first mechanical transmission means interconnecting said control lever and said control member for movement of said control lever; a follow-up member in said selector unit movable relative to said control member; an electric motor; second mechanical transmission means connecting said motor to said control means and to said follow-up member for synchronized operation of said control means and said follow-up member; first switch means operable in response to relative displacement of said control member and said follow-up member to energize said motor to move said follow-up member and said control means to follow the movements of said control member; said first switch means deenergizing said motor in response to the registration of said control member and said follow-up member; a time delay mechanism operative, when actuated in response to the operation of said follow-up member to energize said motor after a predetermined time delay through said first switch means; and means operable after a predetermined initial movement of said second transmission means to interrupt energization of said motor and to actuate said time delay mechanism.

2. Remote control apparatus, as claimed in claim 1, in which said means operable to interrupt energization of said motor and to activate said time delay mechanism includes a cam rigidly movable with said follow-up member.

3. Remote control apparatus, as claimed in claim 2, including a second switch means in circuit with said first switch means and having a first position connecting said first switch means to said motor and a second position disconnecting said first switch means from said motor and connecting said first switch means to said time delay mechanism to activate the latter; said second switch means being moved to said second switch position by said cam after such predetermined initial movement of said second transmission means.

4. Remote control apparatus, as claimed in claim 3, in which said time delay mechanism includes electro-pneumatic relay means operating third switch means from a normally open position to a closed position a predetermined time interval after energization of said electro-pneumatic relay means; said third switch means, in the closed position, connecting said first switch means to said electric motor to re-energize the latter.

References Cited by the Examiner

UNITED STATES PATENTS

| | | | |
|---|---|---|---|
| 2,412,605 | 12/46 | Drake | 318—31 |
| 2,470,820 | 5/49 | Hull | 318—31 |
| 2,471,220 | 5/49 | Lar | 318—31 |
| 2,575,357 | 11/51 | Nichols | 318—31 |
| 2,925,060 | 2/60 | Weeks | 318—31 |

JOHN F. COUCH, *Primary Examiner.*